March 2, 1965 W. R. DAWIRS 3,172,042

PRECISION PHASED PULSE GENERATOR

Filed Aug. 9, 1962 3 Sheets-Sheet 1

INVENTOR.
WILLIS R. DAWIRS

BY

ATTORNEYS

March 2, 1965 W. R. DAWIRS 3,172,042

PRECISION PHASED PULSE GENERATOR

Filed Aug. 9, 1962 3 Sheets-Sheet 2

INVENTOR.
WILLIS R. DAWIRS
BY
ATTORNEYS

March 2, 1965 W. R. DAWIRS 3,172,042

PRECISION PHASED PULSE GENERATOR

Filed Aug. 9, 1962 3 Sheets-Sheet 3

INVENTOR.
WILLIS R. DAWIRS

BY

[signature]
ATTORNEYS 3,172,042
PRECISION PHASED PULSE GENERATOR

Willis R. Dawirs, San Diego, Calif., assignor to the United States of America as represented by the Secretary of the Navy Filed Aug. 9, 1962, Ser. No. 216,002
13 Claims. (Cl. 328—48)
(Granted under Title 35, U.S. Code (1952), sec. 266)

The invention described herein may be manufactured and used by or for the Government of the United States of America for governmental purposes without the payment of any royalties thereon or therefor.

The present invention relates generally to means for incrementally translating information signals into signals having relative phase relationships and in particular is a generator for producing precision phased pulses.

Although many types of pulse phasing apparatus already exist in the prior art which are satisfactory for some purposes, it has been found that they still leave a great deal to be desired. For instance, most are somewhat inaccurate, have errors that are a function of the delay employed, have some jitter at maximum delay, have complex mechanical switching and circuitry which increases cost and reduces reliability, and do not employ modern digital techniques.

The instant invention overcomes most of these difficulties. In its simplest form, it comprises an extremely accurate frequency standard, a binary frequency divider, and a cycle selector. The frequency divider counts down the basic standard frequency by a given ratio and produces reference pulses at an exact number of cycles apart. The repetition rate of the reference pulses is, therefore, equal in accuracy to the basic frequency standard, and the actual rate is dependent upon the standard frequency and upon the ratio of the frequency divider. The cycle selector provides a pulse output coincident with any one of the standard cycles occurring between the reference pulses and, hence, can be phased any amount with respect to the reference pulses. Thus, the smallest increment of phasing is dependent on the frequency of the frequency standard and is of the same accuracy. Of course, the standard frequency may be chosen so that each cycle represents any one of many different parameters, such as, for example, units of microseconds, distance units, or other time units, as desired. In addition, the invention may be made either binary or decimal as perferred, but since making the transition from one to the other would be obvious to one skilled in the art having the benefit of the teachings herein presented, only the binary type of operation will be explained in detail in connection with the disclosed preferred embodiments.

It is, therefore, an object of this invention to provide an improved phase pulse generator.

Another object of this invention is to provide a method and means for producing two pulse outputs of the same accurate repetition rate with the phase of one capable of being accurately shifted with respect to the other.

Still another object of this invention is to provide a method and means of producing a series of pulses that are accurately spaced in time with another series of pulses of the same repetition rate thereof.

A further object of this invention is to provide an improved method and means for indicating range in radar and sonar systems and the like.

A further object of this invention is to provide a precision phased pulsed generator that does not produce errors which are a function of delay and does not have jitter at maximum delay.

A further object of this invention is to provide a precision phased pulse generator employing modern digital techniques.

Another object of this invention is to provide a precision phased pulse generator that may be used as a variable-width gate generator, due to the inherent characteristics of the multivibrator employed therein which produces both on and off gates for both the delay period and for the period from the phased pulse to the next reference pulse.

Another object of this invention is to provide a precision phased pulse generator wherein the maximum phase shift or delay of the phased pulses is only limited by the number of stages of frequency division employed and the frequency standard used.

Another object of this invention is to provide a precision phased pulse generator that may be readily aligned to an external standard of the same rate or multiple or sub-multiple thereof so that the reference pulses are coincident therewith or otherwise accurately referenced thereto.

Another object of this invention is to provide a precision phased pulse generator wherein either binary or decimal signals may be used for frequency division.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
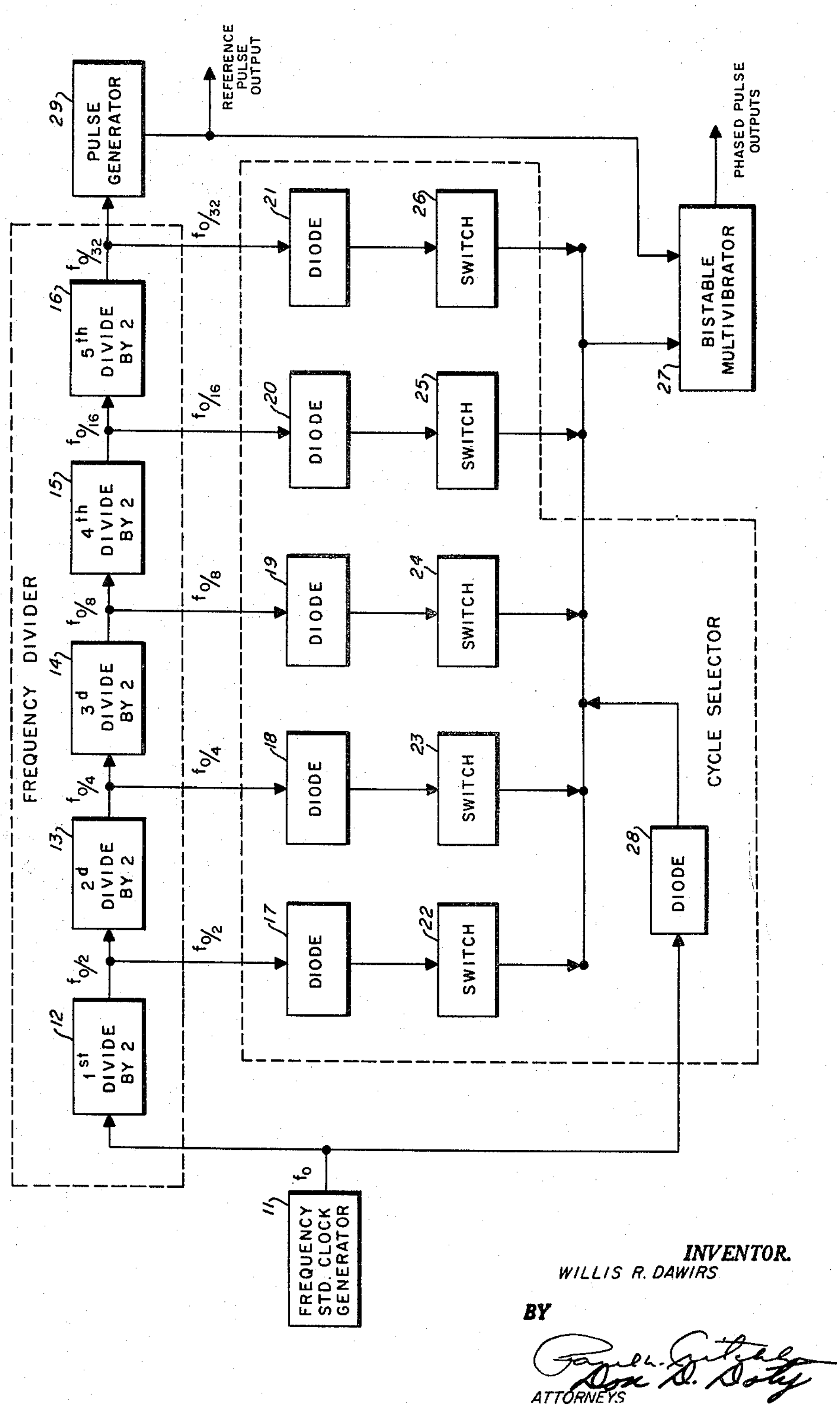
FIG. 1 is a block diagram of an exemplary simplified embodiment of the subject invention.

Referring now to FIG. 1, there is shown an extremely precision frequency standard clock pulse generator 11, the output is coupled through a plurality of series connected divide-by-two dividers 12 through 16. The output of dividers 12 through 16 are respectively applied to a like number of appropriate circuit isolation elements such as diodes 17 through 21, and the outputs thereof are respectively applied through switches 22 through 26 to one of the inputs of a bistable multivibrator 27.

Although said switches are herein shown as being separate and distinct from each other as far as the operation thereof is concerned, it should be understood that they may be either single or multiple switches and in the latter case may be of the structural form of a code-wheel type switch with a single automatic or manual control, if so desired. However, if such a code-wheel switch arrangement is employed, it may be necessary to include a conventional anti-ambiguity circuit of the type, for example, that is manufactured expressly for such situations by the Norden Division of the United Aircraft Company of Milford, Conn., or the Librascope Company of Burbank, Calif., to avoid the discontinuity at the switch-over points.

The output of frequency standard clock generator 11 is also fed through another diode 28 to the aforesaid mentioned input of bistable multivibrator 27. When so arranged, the aforesaid diode-switch combinations and diode 28 which have their outputs interconnected and applied to said bistable multivibrator 27 may, of course, be considered as a multiple-And circuit, inasmuch as they actually perform such an operative function.

The output of divider 16 is reshaped by a pulse generator 29, the output of which constitutes the reference pulse outputs. These reference pulse outputs are also supplied to the other input of bistable multivibrator 27 for a timely actuation thereof to produce the phased pulse outputs, as will be described in more detail subsequently in connection with the discussion of the operation of the subject invention.

Figure 2:
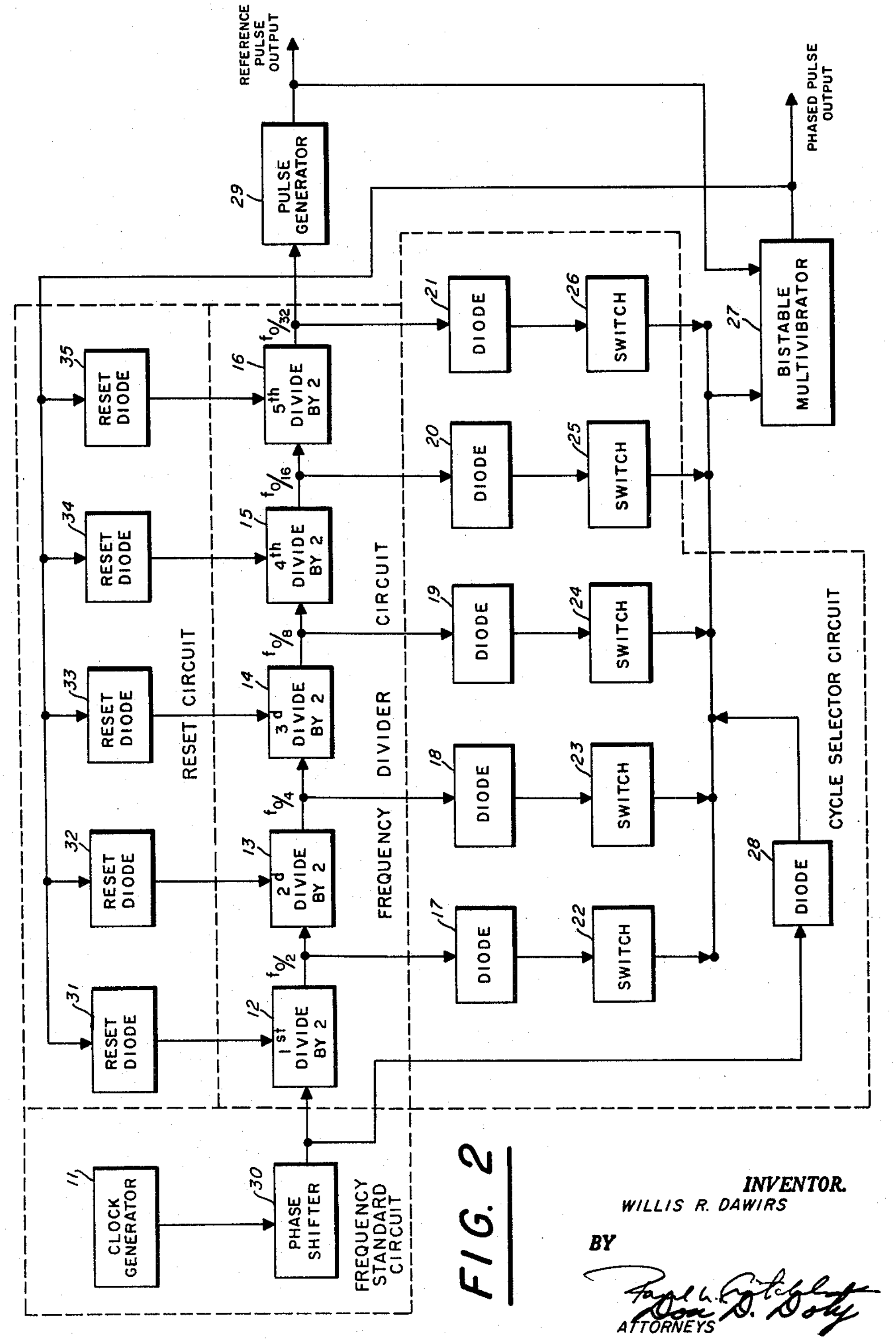
FIG. 2 is a block diagram of the invention which includes additional refinements to affect sub-multiple repetition rates.

With several exceptions, the device of FIG. 2 is similar to the device of FIG. 1. Consequently, for the sake of simplicity of disclosure, like elements thereof have been given the same reference numerals.

One of said exceptions may readily be seen as being the incorporation of a phase shifter 30 between clock generator 11 and the rest of the appropriately associated circuitry such as divider 12 of the frequency divider circuit and diode 28 of the cycle selector circuit.

Another said exception is the inclusion of a plurality of appropriate circuit isolation elements such as reset diodes 31 through 35, each of which receives their input from a feedback of the phased pulse output, and each of which has their outputs respectively connected to a reset input of dividers 12 through 16, respectively.

Briefly, the operation of the subject invention as depicted in FIG. 1 is as follows. Frequency standard clock generator 11 produces an output signal herein designated as $f_0$ which, for example may be a sine wave, a square wave, pulses, or a complex wave. Both the frequency $f_0$ and the accuracy of the frequency clock generator should be so chosen as to appropriately fit the specific application involved. As indicated earlier, the system herein discussed will be of the binary type and, therefore, $f_0$ is a square wave such as is exemplarily illustrated in FIG. 3(*a*). This signal is fed to diodes 17 and 28 of the frequency divider circuit and cycle selector circuit portions of the subject invention, respectively.

The frequency divider comprising dividers 12 through 16, in this particular case, by conventional counter techniques divides signal $f_0$ by a ratio step of the number of stages and type of stages to the repetition rate desired for the reference pulses. In the instant example, $f_0$ is divided by thirty-two by means of five divided-by-two dividers and, of course, the output from the fifth divider then triggers pulse generator 29 to effect output pulses having predetermined waveforms and these pulses thus constitute the reference pulse output signals. In addition, the output of each of the dividers 12 through 16 are supplied to diodes 17 through 21 respectively of the cycle selector. These outputs are also in the form of square waves at the various sub-multiples of $f_0$ and are exemplarily shown in FIGS. 3(*b*) through 3(*f*).

The cycle selector selects any chosen $f_0$ cycle between the reference pulses and provides an output pulse coincident with it. It does this by gating the $f_0$ cycles with a combination of the sub-multiple frequency square waves and then providing an output coincident with the first $f_0$ cycle allowed to pass. As illustrated in FIG. 1, the cycle selector includes switches 22 through 26 as well as diodes 17 through 21 and 28 with the outputs of said switches and diode 28 being interconnected to form a multiple-And circuit having a common output. Said sub-multiple frequency waves are, of course, prevented from feeding back to the frequency divider circuit by means of any one or all of diodes 17 through 21, depending on which of their respectively associated switches are closed.

Figure 3:
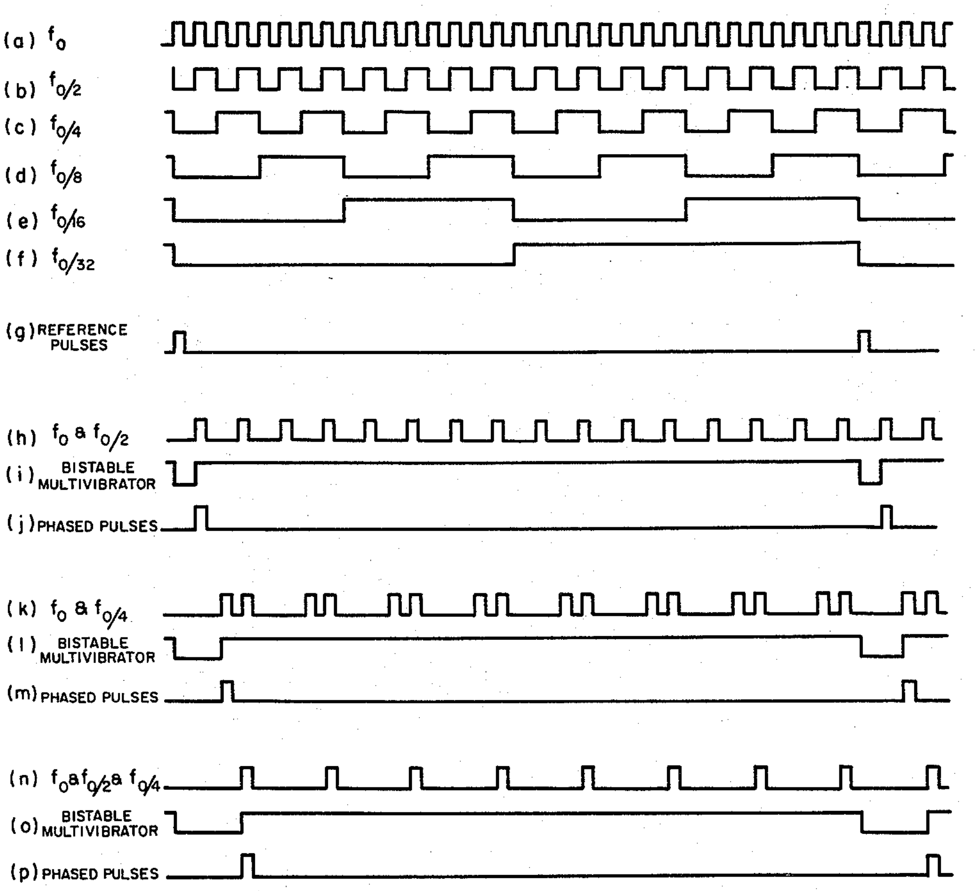
FIG. 3 is a graphical representation of idealized wave forms of some of the various signals emanating from the various components of the embodiment of the invention disclosed in FIG. 1.

In operation, the frequency divider will provide pulses at the outputs of each of the successive dividers of the type typically represented by FIGS. 3(*a*) through 3(*f*). The output of the $f_{0/32}$ divider is fed to pulse generator 29 to provide shaped reference pulse outputs of the type represented by FIG. 3(*g*). These reference pulse outputs are then fed to bistable multivibrator 27 to trigger it into the stable condition indicated by the negative portion of the wave form in FIG. 3(*i*).

To receive a phased pulse output phased one $f_0$ cycle following the reference pulse, the $f_0$ divide-by-two switch, which in this case is switch 22, is closed. This allows the first, third, fifth, seventh, etc. pulses following each reference pulse, of the type represented by FIG. 3(*h*), to be fed to bistable multivibrator 27. Since the first $f_0$ pulse is the first one to hit the bistable multivibrator after the reference pulse triggered it to a negative state, this first pulse triggers it back to the stable state represented by the positive portion of the wave form depicted in FIG. 3(*i*). When going to the stable state condition, a pulse output is provided which is the phased pulse output. The succeeding gated $f_0$ pulses fed to the bistable multivibrator will have no effect on it until it is again triggered into a negative condition of the type shown in FIG. 3(*i*) by another reference pulse. Therefore, with only the $f_{0/2}$ switch 22 closed, each phase pulse will follow each reference pulse by one $f_0$ cycle as is shown in FIG. 3(*j*). To receive a phased pulse delayed or phased two cycles following each reference pulse, only the $f_{0/4}$ switch 23 is closed. In this condition, $f_0$ will be gated by the type of $f_{0/4}$ illustrated in FIG. 3(*c*) to provide gated $f_0$ cycles as is shown in FIG. 3(*k*). In this case, the pulses fed to the bistable multivibrator 27 are the second and third, sixth and seventh, tenth and eleventh, etc. The bistable multivibrator, of course, will trip on the first pulse following the reference pulse which, in this particular case, is the second pulse which causes the waveform exemplarily depicted in FIG. 3(*l*) to be effected. Therefore, the phased pulse follows the reference pulse by two $f_0$ cycles in accordance with the wave form illustrated in FIG. 3(*m*).

To receive a phased pulse delayed or phased by three cycles following each reference pulse the $f_{0/2}$ and $f_{0/4}$ switches 22 and 23 must both be closed. In this condition, $f_0$ will be gated by a combination of $f_{0/2}$ and $f_{0/4}$ so that only the third, seventh, eleventh, etc. pulses of the type shown in FIG. 3(*n*) will be fed to bistable multivibrator 27. This will result in bistable multivibrator 27 switching in accordance with the wave form shown in FIG. 3(*o*) and a phased pulse to result therefrom in accordance with the wave form shown in FIG. 3(*p*).

Expanding, the closing of the $f_{0/8}$ switch 19 will provide four cycles of phasing or delay, the closing of $f_{0/8}$ and $f_{0/2}$ switches 19 and 17 will provide five cycles of phasing or delay, the closing of $f_{0/8}$ and $f_{0/4}$ switches 19 and 18 will provide six cycles of phasing or delay, and closing of $f_{0/8}$, $f_{0/4}$, and $f_{0/2}$, switches 19, 18 and 17 will provide seven cycles of phasing or delay, and so forth and so on up to 32 cycles of phasing or delay, the waveforms of which are not disclosed because they should be obvious to the artisan from the teachings already presented and because such representations could go on ad infinitum.

The following table shows the gate combinations for various amounts of phase shift that may be obtained by a five gate selector circuit:

| Gating combinations: | $f_0$ cycles of phase shift |
|---|---|
| $f_0+f_2$ | 1 |
| $f_0+f_4$ | 2 |
| $f_0+f_2+f_4$ | 3 |
| $f_0+f_8$ | 4 |
| $f_0+f_2+f_8$ | 5 |
| $f_0+f_4+f_8$ | 6 |
| $f_0+f_2+f_4+f_8$ | 7 |
| $f_0+f_{16}$ | 8 |
| $f_0+f_2+f_{16}$ | 9 |
| $f_0+f_4+f_{16}$ | 10 |
| $f_0+f_2+f_4+f_{16}$ | 11 |
| $f_0+f_8+f_{16}$ | 12 |
| $f_0+f_2+f_8+f_{16}$ | 13 |
| $f_0+f_4+f_8+f_{16}$ | 14 |
| $f_0+f_2+f_4+f_8+f_{16}$ | 15 |
| $f_0+f_{32}$ | 16 |
| $f_0+f_2+f_{32}$ | 17 |
| $f_0+f_4+f_{32}$ | 18 |
| $f_0+f_2+f_4+f_{32}$ | 19 |

| Gating combinations: | $f_0$ cycles of phase shift |
|---|---|
| $f_0+f_8+f_{32}$ | 20 |
| $f_0+f_2+f_8+f_{32}$ | 21 |
| $f_0+f_4+f_8+f_{32}$ | 22 |
| $f_0+f_2+f_4+f_8+f_{32}$ | 23 |
| $f_0+f_{16}+f_{32}$ | 24 |
| $f_0+f_2+f_{16}+f_{32}$ | 25 |
| $f_0+f_4+f_{16}+f_{32}$ | 26 |
| $f_0+f_2+f_4+f_{16}+f_{32}$ | 27 |
| $f_0+f_8+f_{16}+f_{32}$ | 28 |
| $f_0+f_2+f_8+f_{16}+f_{32}$ | 29 |
| $f_0+f_4+f_8+f_{16}+f_{32}$ | 30 |
| $f_0+f_2+f_4+f_8+f_{16}+f_{32}$ | 31 |

Zero delay is not indicated in this cycle, since in this scheme the cycle selector multivibrator cannot recover rapidly enough after being triggered by the reference pulse for it to be triggered back in essentially zero time. When zero is also required, it may be obtained by switching so that the reference pulses are provided at the phase pulse output at the zero delay setting. It is also possible to add fixed delays in such a manner that the cycle selector multivibrator is initially triggered a half cycle ahead of the reference pulse, thereby allowing it to be re-triggered at zero time.

In most uses the phased pulses of the subject invention may be considered to follow the reference pulses by a given number of cycles; therefore, it may be considered to be an extremely accurate delay generator. However, since this device is an accurate phasing system, the same phased pulses may be considered to lead their respective succeeding reference pulses by the remaining number of cycles. In some cases, it may be desirable to phase the phased pulses past one or more succeeding reference pulses so that an individual phased pulse may be identified with a reference pulse several pulses ahead. For example, in the basic device illustrated in FIG. 1, a phased pulse may lag a referenced pulse by 20 cycles. It can also be considered to lag the previous reference pulse by 20+32 cycles or by 52 cycles, the next previous reference pulse by 20+32+32 or 84 cycles, etc. It may be considered to the first subsequent reference pulse by 12 cycles, another by 44, and still another by 76 cycles, etc.

As previously mentioned, switches 22 through 26 which control the various aforesaid gates and gating operations may be a number of single switches as is shown in FIG. 1. Or, alternatively, they may be combined in the form of a code wheel of switches with a single control, the rotation of which will consecutively choose each possible or some preferred combination thereof and thus shift the phase pulses step by step through a predetermined complete cycle.

Thus, it can be readily seen that the subject invention has considerable flexibility in the phasing of pulses with respect to a predetermined reference pulse as a result of using counter gating techniques, and, moreover, that extremely long and extremely accurate phasing of said pulses may be affected thereby as well.

At this time, it should be noteworthy that although only 5 divider circuits and their respective switching circuits are shown for the purpose of illustrating the basic circuitry and principles of operation of this invention, it need not be so limited in number because any number thereof might be used as necessary to produce switching delays that are pertinent to any particular operational circumstances, since so doing would obviously be within the purview of one skilled in the art having to benefit from the teachings herein presented.

It should also be noteworthy that a phase shifter may be incorporated in the device of FIG. 1 in a manner similar to that of the incorporation of phase shifter 30 in the device of FIG. 2 for the same reason.

For the most part, the device of FIG. 2 operates in essentially the same way the device of FIG. 1 operates.

Normally, the frequency divider of FIG. 1 is allowed to run free and recycle at the lowest rate of the lowest divider. But, by incorporating a small amount of additional circuitry the free running divider circuit of FIG. 1 may be made to recycle at any sub-multiple of $f_0$ less than the divider's normal rate. This is done in the embodiment of FIG. 2 by resetting all of the dividers stages to zero at the occurrence of the phased pulse rather than allowing it to occur normally. Of course, the structure which effects this operation is the phased pulse feedback circuit, including the reset diodes. If, for example, the phased pulse of the thirty-two cycle divider were set to the seventeenth cycle and all divider stages reset to zero at this time, the unit would start and continue dividing $f_0$ until it came to the seventeenth cycle, at which time it would again be reset and again start counting from zero. Because it would continue to count to seventeen and be reset again and again, a series of pulses at a repetition rate of $f_{0/17}$ instead of $f_{0/32}$ would be produced. Inasmuch as the phased pulse can be set to any cycle up to the maximum of the divider circuit, the output can be set at any sub-multiple of $f_0$ between $f_0$ and the limit of the divider circuit.

Hence, it can readily be seen that when this modification is incorporated in the basic system of FIG. 1, the result is the system of FIG. 2 and then the phased pulse is used to reset the divider circuit thereof. Therefore, the output therefrom is a variable repetition rate with no phased pulse, as originally defined, available.

Figure 4:
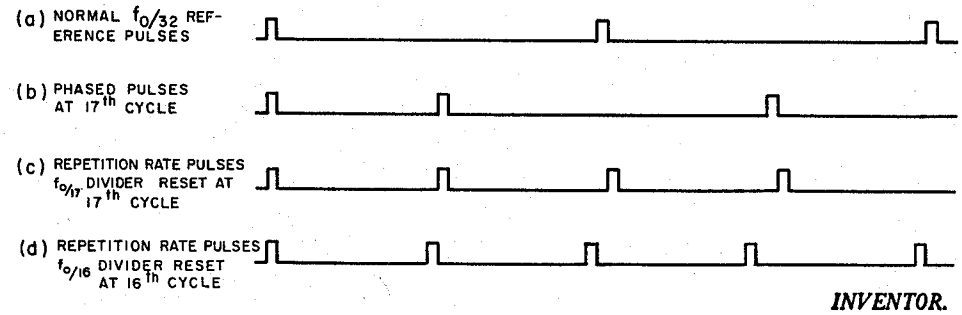
FIG. 4 is a graphical representation of the sub-multiple frequency divider pulse relationships emanating from the embodiment of the invention depicted in FIG. 2.

Exemplary wave forms of the normal $f_{0/32}$ reference pulses, the phased pulses at the seventeenth cycle, the repetition rate pulses with the divider reset at the seventeenth cycle, and the repetition rate pulses with the divider set at the sixteenth cycle are ideally represented in FIG. 4(*a*) through 4(*d*), respectively, to illustrate how the aforementioned operation may be effected.

Another modification that is incorporated in the embodiment of FIG. 2 is the inclusion of phase shifter 30 therein. The purpose of this phase shifter is to enable the phase of the clock generator output signal to be shifted in such manner that the phase of the reference pulses may be synchronized or correlated with some external signal. In other words, if the reference pulses of the subject invention are to be synchronized with an outside signal source, the reference pulses may be phase shifted with respect thereto until they are coincident therewith or have some other desired phase relationship. Shifting of the reference pulses under such circumstances, of course, effects the shifting of the phase pulse outputs of the invention simultaneously therewith and, hence, the latter is also shifted with respect to the aforesaid external signal.

Like in the device of FIG. 1, it should be understood that incorporation of the phase shifter in the device of FIG. 2 is optional and, thus, depends on the operational circumstances involved.

It should be further understood that all of the elements and components disclosed herein in block diagram form are well known and conventional per se and that is their unique interconnection and interaction which forms the precision phased pulse generator constituting this invention.

Obviously, many modifications and variations of the present invention are possible in the light of the above teachings. It is, therefore, to be understood that within the scope of the appended claims the invention may be practiced otherwise than as specifically described.

What is claimed and desired to be protected by Letters Patent of the United States is:

1. A precision phased pulse generator comprising in combination, clock generator means for generating accurately timed pulses, a frequency divider having a plurality of series connected divide-by-two dividers, a like plurality of diodes respectively connected to the outputs of each of said divide-by-two dividers, a like plurality of switches each of which have their inputs respectively coupled to the outputs of each of said diodes and their outputs interconnected, another diode interconnecting the output of said clock generator means and the interconnected outputs of said switches, a bistable multivibrator means having one of the inputs thereof coupled to the interconnected outputs of said switches and the aforesaid another diode, and a pulse generator connected between the output of said frequency divider and the other input of said bistable multivibrator.

2. The invention according to claim 1 further characterized by means inserted between the inputs to said frequency divider and another diode and the output of said clock generator means for selectively varying the phase of the output therefrom.

3. A precision phased pulse generator comprising in combination, clock generator means for generating accurately timed pulses, a frequency divider having a plurality of series connected divide-by-two dividers, a like plurality of diodes respectively connected to the outputs of each of said divide-by-two dividers, a like plurality of switches each of which have their inputs respectively coupled to the outputs of each of said diodes and their outputs interconnected, another diode interconnecting the output of said clock generator means and the interconnected of said switches, a bistable multivibrator means having one of the inputs thereof coupled to the interconnected outputs of said switches and the aforesaid another diode, a pulse generator connected between the output of said frequency divider and the other input of said bistable multivibrator, and a plurality of reset diodes each having their inputs connected to the output of said bistable multivibrator and their outputs respectively connected to the aforesaid plurality of dividers.

4. The device of claim 3 further characterized by means inserted between the inputs to said frequency divider and another diode and the output of said clock generator means for selectively varying the phase of the output therefrom.

5. Means for producing an output pulse that has an accurate phase relationship with a reference pulse comprising in combination a frequency standard clock generator, a plurality of series connected dividers with the first one thereof having its input coupled to the output of said frequency standard clock generator, a multiple-And circuit coupled to the outputs of each of said series connected dividers and the output of the aforesaid frequency standard clock generator, a pulse generator coupled to the output of the last divider of said series connected dividers, and a bistable multivibrator having one of its inputs connected to the output of said multiple-And circuit and the other input thereof coupled to the output of said pulse generator.

6. The device of claim 5 wherein said multiple-And circuit comprises a plurality of diodes equal in number to numbers of diodes in said plurality of series connected dividers, a like plurality of switches respectively connected to the outputs of said diodes, and another diode having its output connected to each of the outputs of the aforesaid switches.

7. The device of claim 5 further characterized by means inserted between the input of said multiple-And circuit and the output of said frequency standard clock generator for selectively shifting the phase thereof.

8. Means for producing an output pulse that has an accurate phase relationship with a reference pulse comprising in combination a frequency standard clock generator, a plurality of series connected dividers with the first one thereof having its input coupled to the output of said frequency standard clock generator, a multiple-And circuit coupled to the outputs of each of said series connected dividers and the output of the aforesaid frequency standard clock generator, a pulse generator coupled to the output of the last divider of said series connected dividers, a bistable multivibrator having one of its inputs connected to the output of said multiple-And circuit and the other input thereof coupled to the output of said pulse generator, and means coupled to the output of said bistable multivibrator for resetting each of said dividers to zero in synchronism with predetermined phase pulse outputs therefrom.

9. The device of claim 8 further characterized by means inserted between the input of said multiple-And circuit and the output of said frequency standard clock generator for selectively shifting the phase thereof.

10. A precision phased pulse generator comprising in combination, an accurate clock generator, at least a pair of series connected dividers coupled to the output of said clock generator, a like number of diodes respectively coupled to the outputs of said series connected dividers, a like number of switches respectively coupled to the outputs of said diodes, another diode interconnecting the outputs of each of said switches and the output of the aforesaid clock generator, a pulse generator connected to the output of said series connected dividers, and a bistable multivibrator having a pair of inputs one of which is connected to the output of said pulse generator and the other of which is connected to the outputs of said switches and the aforesaid another diode.

11. The device of claim 10 further characterized by a phase shifter connected between the output of said clock generator and the inputs of said series connected dividers and said another diode.

12. The device of claim 10 further characterized by a plurality of reset diodes respectively connected between the output of said bistable multivibrator and each of the aforesaid series connected dividers.

13. The device of claim 10 further characterized by a phase shifter connected between the output of said clock generator and the inputs of said series connected dividers and said another diode, and a plurality of reset diodes respectively connected between the output of said bistable multivibrator and each of the aforesaid series connected dividers.

References Cited by the Examiner

UNITED STATES PATENTS

| | | | |
|---|---|---|---|
| 2,766,379 | 10/56 | Pugsley | 331—51 |
| 2,937,337 | 5/60 | Jones et al. | 328—48 |
| 2,972,718 | 2/61 | Alperin et al. | 328—48 |
| 3,083,270 | 3/63 | Mayo | 331—51 |

ROY LAKE, *Primary Examiner.*

JOHN KOMINSKI, *Examiner.*